United States Patent Office 3,419,120
Patented Dec. 31, 1968

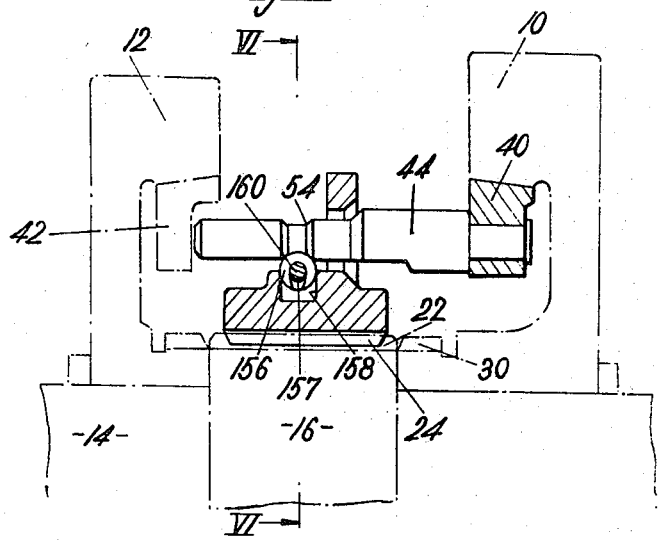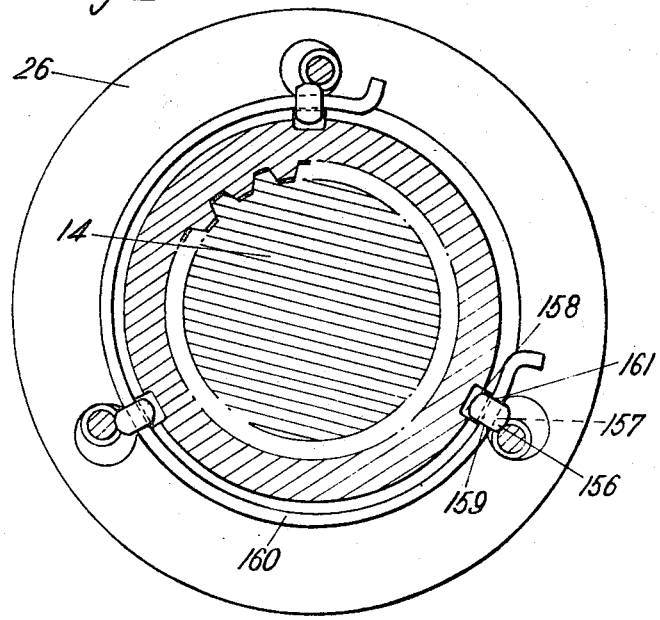

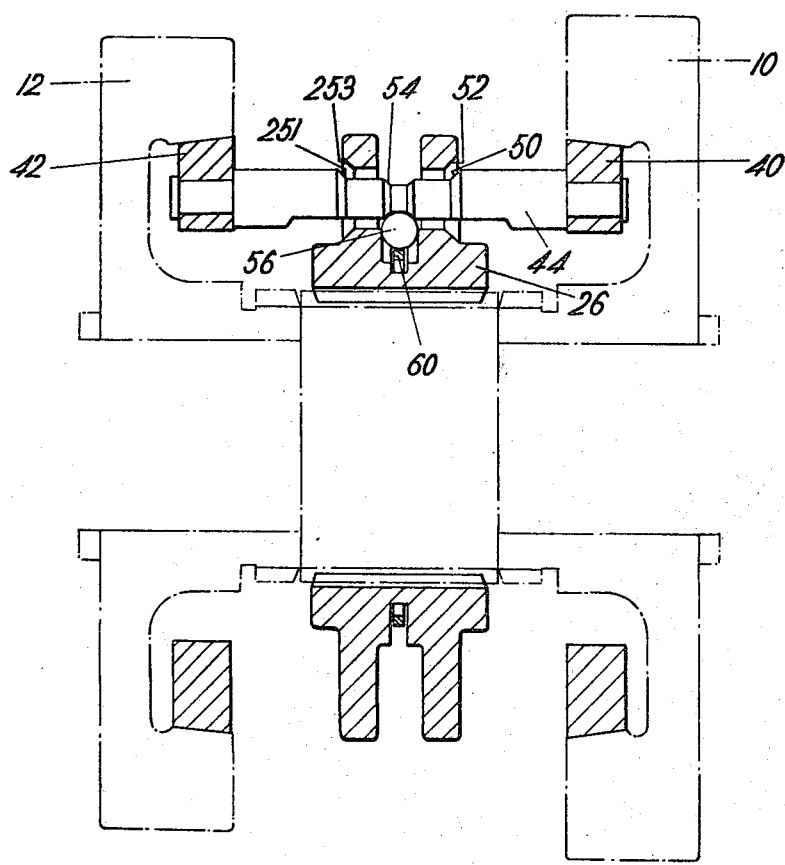

3,419,120
TRANSMISSION SYNCHRONIZING CLUTCH WITH BALK PINS THAT ARE CIRCUMFERENTIALLY BIASED
Thomas Charles Felix Stott, Harpenden, England, assignor to General Motors Corporation, Detroit, Mich., a corporation of Delaware
Filed June 23, 1966, Ser. No. 559,822
Claims priority, application Great Britain, July 1, 1965, 27,843/65
9 Claims. (Cl. 192—53)

ABSTRACT OF THE DISCLOSURE

The disclosure shows a transmission synchronizing clutch having a shift collar splined to a shaft for rotation therewith and relative axial movement from a disengaged position to a synchronized position and thereafter to an engaged position in which positive clutch teeth elements on the shift collar and a gear rotatably mounted on the shaft are engaged to effect a positive drive between the gear and the shaft. The shift collar is yieldably connected to balk pins by a detent ball and annular detent groove in the balk pins which yieldably hold the balk pins for movement with the shift collar from the disengaged position to the synchronizing position in which the balk pins move the synchronizing clutch cone members on the balk pin and on the gear together for synchronization. The detent ball and groove also biases the balk pins circumferentially from a non-inhibiting position permitting free relative movement between the shift collar and balk pin to an inhibiting position limiting relative movement of the shift collar and the balk pins when the shift collar is in the disengaged position and prior to movement to the synchronizing position.

---

This invention relates to clutch coupling arrangements.

According to the invention, a clutch coupling arrangement in which axial movement of a clutch coupling sleeve into positive engagement with a positive-clutch portion of a rotary drive member is inhibited by a balk-pin synchronizer mechanism until such time as the rotary speeds of the clutch coupling sleeve and rotary drive member approach synchronism includes a device for resiliently, biasing the balk pins of the synchronizer mechanism in a circumferential direction.

The resilient biasing of the balk pins in a circumferential direction is preferably effected by an energizing device constituting a yieldable axial connection between the clutch coupling sleeve and the balk pins.

In a clutch coupling arrangement according to the invention, from another aspect, a balk-pin synchronizer mechanism includes a resiliently biased energizing device which constitutes a yieldable axial connection between a slidable clutch coupling sleeve and a set of balk pins carried by a synchronizer ring, and which simultaneously applies a resilient bias in a circumferential direction to the balk pins and synchronizer ring.

The device for resiliently biasing the balk pins in a circumferential direction is preferably effective in either circumferential direction.

The device for resiliently biasing the balk pins in a circumferential direction conveniently acts on the balk pins themselves, and may, for example, comprise a number of spring-biased balls each of which acts on a respective one of the balk pins. For instance, the clutch coupling arrangement may have three of the balk pins spaced symmetrically 120° apart, and three biasing balls received within the outer end portions of respective radial apertures in the clutch coupling sleeve and biased in a radially outward direction by a common circumferential spring into resilient engagement with the respective balk pins. The spring may, for example, be disposed in a peripheral groove in the clutch coupling sleeve radially inwardly of the balls. Alternatively, the balls (which term is used to include similarly-acting spherically-surfaced members) may each have a through aperture by means of which the members are mounted on the circumferential spring in the manner of beads on a string.

The preferred embodiments of a clutch coupling arrangement according to the present invention will now be described with reference to the accompanying drawings, in which:

FIGURE 5 is a partial longitudinal section similar to FIGURE 1, but of a modified embodiment of a clutch coupling arrangement according to the invention;

FIGURE 6 is a cross-section on the line VI—VI of FIGURE 5, in the direction of the arrows; and FIGURE 7 is a partial longitudinal section similar to FIGURE 1, but of another modified embodiment of a clutch coupling arrangement according to the invention.

Figure 1:
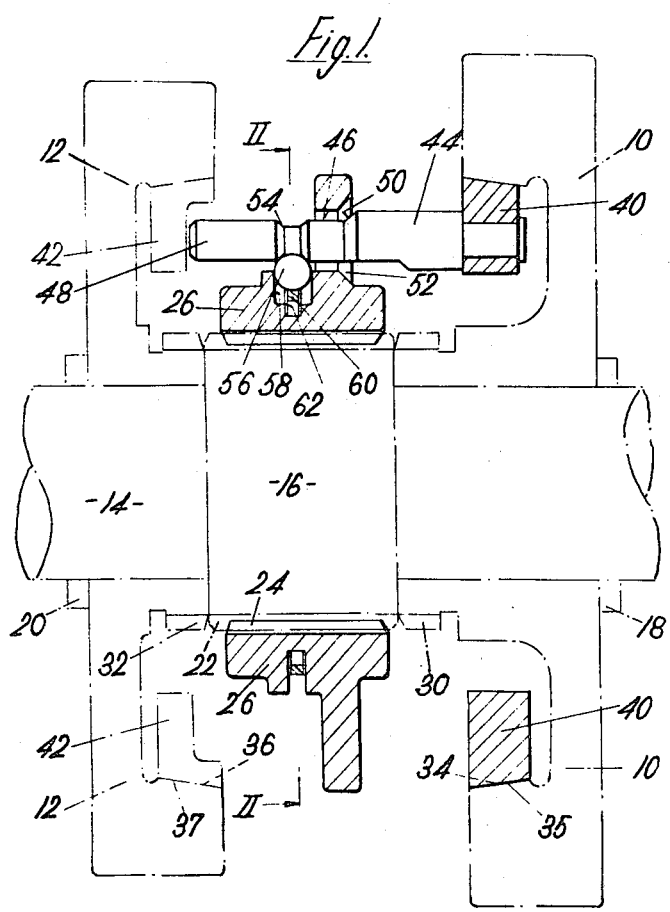
FIGURE 1 is a partial longitudinal section through one embodiment of a clutch coupling arrangement according to the invention.
Figure 2:
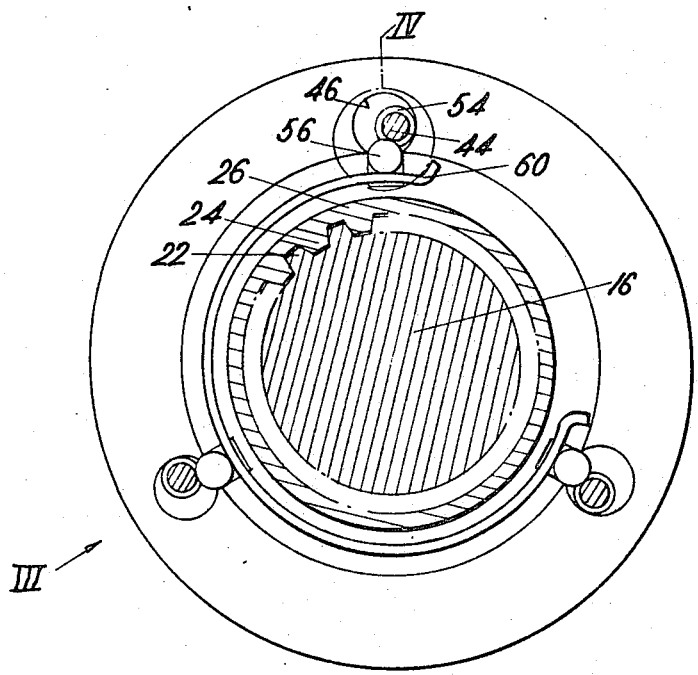
FIGURE 2 is a cross-section on the line II—II of FIGURE 1, in the direction of the arrows.
Figure 3:
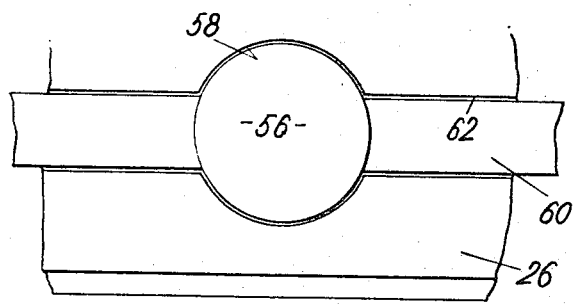
FIGURE 3 is a view of the direction of the arrow III in FIGURE 2.

The embodiment of the clutch coupling arrangement

The embodiment of the clutch coupling arrangement shown in FIGURES 1 to 4 will be described by way of example with reference to second and third ratio gearwheels 10 and 12 of a conventional constant-mesh gearbox, in which, in a conventional manner not illustrated, in detail, the second and third ratio gearwheels are freely mounted on a gearbox mainshaft 14 and are constantly driven at different speeds by meshing engagement with corresponding layshaft gears driven by way of a pair of spur gears from a gearbox input shaft. An arrangement of this general kind is illustrated in somewhat greater detail in United States patent specification No. 2,060,971, having the same assignees as the present application.

The second and third ratio gearwheels 10 and 12 are spaced apart by a collar portion 16 of the gearbox mainshaft 14 and are prevented from moving apart by stop rings 18 and 20 secured to the gearbox mainshaft.

The collar portion of the gearbox mainshaft is formed with axially extending external splines 22 which engage corresponding internal splines 24 of a clutch coupling sleeve 26, which is thereby mounted in an axially slidable manner on the collar portion of the mainshaft. The second and third ratio gearwheels 10 and 12 are each formed, at a point adjacent the external splines on the collar portion of the gearbox mainshaft, with a respective ring of external dog teeth 30 and 32, the arrangement being such that on movement of the clutch coupling sleeve in either direction from an axially centered position, the internal splines of the clutch coupling sleeve form a positive dog clutch connection with the respective set of dog teeth, thereby connecting the gearbox mainshaft to the respective gearwheel for rotation at the speed as the selected gearwheel.

The second and third ratio gearwheels 10 and 12 each have a respective internal frusto-conical synchronizer surface 34 and 36 on the axial side adjacent the clutch coupling sleeve. Respective synchronizer rings 40 and 42 are disposed between the gearwheels and the clutch coupling sleeve, each synchronizer ring having an external frusto-conical synchronizer surface 35 and 37 for frictional engagement with the corresponding internal synchronizer surface 34 and 36 on the adjacent gearwheel.

The synchronizer ring 40 for the second ratio gearwheel 10 carries three balk pins 44 which are spaced symmetrically 120° apart around the ring and extend axially from the second ratio synchronizer ring through an aperture 46 in the clutch coupling sleeve 26 and into abutting engagement with the third ratio synchronizer ring 42. The portion 48 of each balk pin which extends through the respective aperture in the clutch coupling sleeve is of lesser diameter than the portion of the balk pin adjacent the second ratio synchronizer ring, the two portions being separated by a frusto-conical balk surface 50 which is disposed adjacent an internal frusto-conical balk surface 52 of the aperture in the clutch coupling sleeve. The arrangement is such that, with the balk pin circumferentially centered with respect to its aperture, the balk pin can move freely in an axial direction through the aperture, but when these parts are not circumferentially centered, as occurs when the rotary speeds of the synchronizer ring and clutch coupling sleeve are not in synchronism, the two balk surfaces interengage to inhibit axial movement of the clutch coupling sleeve towards the synchronizer ring and the associated gearwheel.

The lesser-diameter portion 48 of each balk pin is formed with a circumferential detent groove 54 for the reception of a biasing ball 56 which is received within the outer end portion of a respective radial aperture 58 in the clutch coupling sleeve and biased in a radially outward direction by a circumferential spring 60 which is contained within a peripheral groove 62 which intersects the three radial apertures 58 in the clutch coupling sleeve. The biasing balls 56 have two functions. Firstly, they act as an energizing device for the synchronizer rings 40 and 42 by providing a yieldable axial connection, at the detent grooves in the pins, between the axially slidable clutch coupling sleeve and the balk pins and synchronizer rings. Secondly, as is most clearly illustrated in FIGURE 4, the biasing balls apply a component of force in a circumferential direction to the balk pins 44, this component of force thus constituting a resilient bias which acts in a circumferential direction on the balk pins in all axial positions of the pins to cause throw-over of the balk pins into the circumferential position shown in FIGURE 4, in which the frusto-conical balk surfaces 50 and 52 of the balk pins and of the apertures in the clutch coupling sleeve 26 are resiliently maintained in engagement.

Figure 4:
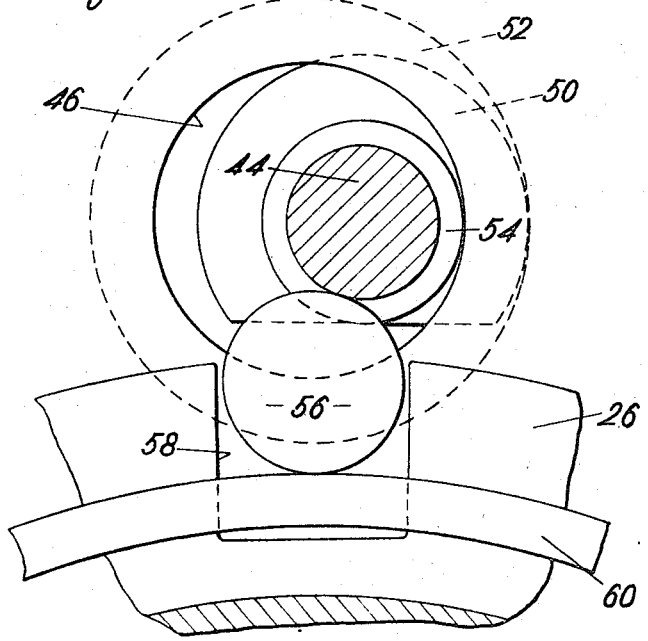
FIGURE 4 is an enlarged view of the portion of FIGURE 2 within the circle IV.

The circumferential direction in which the throw-over occurs depends on the relative speeds of rotation of the clutch coupling sleeve and the balk pins and synchronizer ring. The throw-over position shown in FIGURE 4 is obtained when the speed of rotation of the clutch coupling sleeve in a clockwise direction is less than that of the balk pins and synchronizer ring 40.

The operation of the clutch coupling arrangement shown in FIGURES 1 to 4 will now be described in the context of a downshift from third to second ratio. In third ratio, the clutch coupling sleeve 26 would be below the neutral position shown in FIGURE 1, and the internal splines 24 of the clutch coupling sleeve would be in mating engagement with the external dog teeth 32 of the third ratio gearwheel 12 to provide a positive-clutch connection by means of which the gearbox mainshaft 14 is driven at the same speed of rotation as the third ratio gearwheel.

To initiate a downshift from third to second ratio, a gearshift lever (not shown) is operated to cause a selector fork (also not shown) to move the clutch coupling sleeve 26 in an axial direction towards the second ratio gearwheel 10, thereby initially disengaging the internal splines 24 of the clutch coupling sleeve from the external dog teeth 32 of the third ratio gearwheel, and subsequently establishing the neutral position of the clutch coupling sleeve shown in FIGURE 1, in which the gearbox mainshaft is disconnected from both the third and second ratio gearwheels, and so no longer receives drive from the gearbox input shaft.

When the clutch coupling sleeve reaches the neutral position, the resiliently biased balls 56 snap into the respective circumferential grooves 54 in the balk pins 44, so giving the condition illustrated in FIGURE 1. As is most clearly illustrated in FIGURE 4, the biasing balls 56 apply a component of force in a circumferential direction to the balk pins 44, this component of force thus constituting a resilient bias which acts in a circumferential direction on the balk pins to cause throw-over of the balk pins, the circumferential direction of throw-over depending on the relative speeds of rotation of the clutch coupling sleeve 26 and the second ratio synchronizer ring 40.

Engagement of the frusto-conical balk surfaces 50 and 52 of the balk pins 44 and of the apertures 46 in the clutch coupling sleeve is effected upon further axial movement of the clutch coupling sleeve beyond the neutral position. In this condition the circumferentially acting resilient bias between the biasing balls 56 and the balk pins 44 is maintained.

The biasing balls 56 also act as an energizing device for the second ratio synchronizer ring 40 by providing a yieldable axial connection between the axially slidable clutch coupling sleeve 26 and the balk pins 44 of the second ratio synchronizer ring. Consequently, continued axial movement of the clutch coupling sleeve causes axial movement of the balk pins and second ratio synchronizer ring 40. The frusto-conical synchronizer surfaces 34 and 35 of the second ratio synchronizer ring 40 and of the second ratio gearwheel 10 are thereby brought into frictional engagement, to begin to bring the speed of rotation of the clutch coupling sleeve 26 into synchroism with that of the second ratio gearwheel. At this stage the direction of throw-over has, as already indicated, been decided according to the relative speeds of rotation, and the circumferentially acting resilient bias assists in maintaining the contact between the frusto-conical balk surfaces 50 and 52. The approach towards synchronism continues until the axial force still being imparted to the clutch coupling sleeve by the gearshift lever overcomes the resilient bias of the biasing balls 56 and allows the balls to snap out of the respective circumferential detent grooves 54 in the balk pins 44. Until such time as the speeds of rotation of the clutch coupling sleeve and of the second ratio gearwheel approach synchronism, however, the balk pins 44 remain out of alignment in the apertures 46 of the clutch coupling sleeve, whereby the interengaging balk surfaces 50 and 52 inhibit further axial movement of the clutch coupling sleeve relatively to the balk pins, the second ratio synchronizer ring, and the second ratio gearwheel. In this asynchronous condition, the internal splines 24 of the clutch coupling sleeve are prevented from coming into meshing engagement with the external dog teeth 30 of the second ratio gearwheel.

Finally, the frictional engagement of the synchronizer surfaces 34 and 35 causes the rotary speeds of the clutch coupling sleeve 26 and of the second ratio gearwheel 10 to attain or closely approach synchronism, whereupon the axial force still being applied to the clutch coupling sleeve is sufficient to cause the frusto-conical balk surfaces 52 of the clutch coupling sleeve to ride over the balk surfaces 50 of the balk pins, thereby bringing the apertures 46 in the clutch coupling sleeve into circumferential alignment with the respective balk pins 44, and allowing the clutch coupling sleeve 26 to move axially relatively to the balk pins, the second ratio synchronizer ring and the second ratio gearwheel to bring the internal splines 24 of the clutch coupling sleeve into meshing engagement with the external dog teeth 30 of the second ratio gearwheel 10; and so establishing a positive connection by means of which the clutch coupling sleeve and, therefore, the gearbox mainshaft 14 is driven at the rotary speed of the second ratio gearwheel.

The modified embodiment of the clutch coupling arrangement which is shown in FIGURES 5 and 6 differs from the embodiment just described in that, for convenience of assembly, the biasing balls 56 are replaced by spherically-surfaced members 156 each of which has a through aperture 157 extending between a pair of circular plane surfaces 159 and 161, the circumferential spring 160 extending through these apertures such that the spherically surfaced members 156 are mounted on the spring in the manner of beads on a string. Each of the spherically-surfaced members is located by being received within the outer end portion of a respective radial aperture 158 in the clutch coupling sleeve 26. The embodiment of the clutch coupling sleeve shown in FIGURES 5 and 6 is in other respects the same as the embodiment shown in FIGURES 1 to 4, and operates in the same manner, and the spherically-surfaced members 156 are comprehended within the term "balls" used in the appended claims.

The modified embodiment of the clutch coupling arrangement which is shown in FIGURE 7 is very similar in construction and operation to the embodiment described with reference to FIGURES 1 to 4, and like reference numerals are used for like parts. However, the embodiment shown in FIGURE 7 gives a balking action during an upshift as well as during a downshift, by reason of a second frusto-conical balk surface 251 on each of the balk pins 44, this surface being positioned to co-operate with a corresponding internal frusto-conical balk surface 253 in a second aperture in the clutch coupling sleeve 26. Additionally, the balk pins 44 are connected to the third ratio synchronizer ring 42 as well as being connected to the second ratio synchronizer ring 10, whereby the synchronizer rings are connected together by means of the balk pins.

In the described embodiments of the clutch coupling arrangement according to the invention, the energizing device also acts to resiliently bias the balk pins of the synchronizer mechanism in a circumferential direction to give a throw-over action which brings the frusto-conical balk surfaces into engagement even during rapid axial movement of the clutch coupling sleeve. This provides a more effective synchronizing action, and reduces the danger of positive-clutch engagement occurring before the relatively rotatable parts of the positive clutch attain or closely approach synchronism. Also, the balls or other spherically-surfaced members make it unnecessary for the circumferential spring to contact the balk pins, whereby wear on the spring is virtually eliminated.

The first two embodiments of the clutch coupling arrangement according to the invention have, for simplicity, been described in relation to a downshift only. The torque loads occurring during a downshift tend to be larger than during an upshift, and for some applications it is sufficient for the balking action to operate only during a downshift. However, the feature of resiliently biasing the balk pins of the synchronizer mechanism in a circumferential direction to give a throw-over action can be utilized in any type of clutch coupling arrangement incorporating pin-type synchronization. For example, as already referred to in relation to FIGURE 7, the balking action, and correspondingly the resiliently biased circumferential throw-over, may be effective during both a downshift and an upshift. The resiliently biased circumferential throw-over may be made effective for engagement of any ratio, depending on design requirements the references to the second and third ratios in the description of the embodiments shown in the drawings being by way of illustration.

I claim:

1. A clutch coupling arrangement comprising a rotary drive member having a positive-clutch portion and a synchronizing clutch portion, a rotary shaft member, clutch coupling sleeve means mounted on the rotary shaft member for rotation therewith and axial movement relatively thereto between a disengaged position and an engaged position, positive-clutch means on the clutch coupling sleeve means disengaged in the disengaged position of the clutch couplng sleeve means and engaged by axial movement of the clutch coupling sleeve means in the engaged position with the positive-clutch portion on the rotary drive member, balk pin synchronizer means having a synchronizer clutch member, shouldered balk pin means connected to said clutch member and operatively connected to said clutch coupling sleeve means operative in an inhibiting position for inhibiting axial movement of the clutch coupling sleeve means relative to said balk pin means when said synchronizer clutch member engages said synchronizing clutch portion until the rotary speeds of the clutch coupling sleeve means and the rotary drive member approach synchronism and said balk pin means being circumferentially movable relative to said clutch coupling sleeve means to a non-inhibiting position permitting movement of said clutch coupling sleeve means relative to said balk pin means, said clutch coupling sleeve means being operative on movement from said disengaged position in which said positive-clutch portion and said positive clutch means and said synchronizer clutch portion and said synchronizer clutch means are disengaged to a synchronizing position for initially engaging said synchronizer clutch portion and said synchronizer clutch means for synchronization and then moving further to said engaged position, and biasing means directly connected between said clutch coupling sleeve means and said balk pin means for biasing and moving the balk pin means in a circumferential direction from said non-inhibiting to said inhibiting position when said clutch coupling sleeve is in said disengaged position and prior to reaching said synchronizing position.

2. A clutch coupling according to claim 1 and said biasing means including a ball-like member and a resilient member on the clutch coupling sleeve means biasing said ball-like member to engage said balk pin means.

3. A clutch coupling arrangement according to claim 1 and said biasing means also providing a yieldable axial connection between the clutch coupling sleeve means and the balk pin for moving said balk pin means with said clutch coupling sleeve means from said disengaged position to said synchronizing position and yielding in said synchronizing position under an additional force for continued movement of said clutch coupling sleeve means to said engaged position.

4. A clutch coupling arrangement according to claim 3 wherein the biasing means for biasing the balk pins of the synchronizer mechanism in a circumferential direction comprises a plurality of balls, an annular detent groove in the balk pin means, spring means biasing each ball in a radial outward direction into engagement with said grooves in the disengaged position of said clutch coupling sleeve means.

5. A clutch coupling arrangement according to claim 4 wherein the biasing means includes radial apertures and a peripheral groove in said clutch coupling sleeve means, the balls are received within the outer end portions of respective radial apertures, said spring means being a common annular spring disposed in the peripheral groove in the clutch coupling sleeve radially inwardly of the balls and biasing the balls outwardly to engage said detent groove.

6. A clutch coupling arrangement according to claim 4 wherein the spring means for biasing the balls is a common annular spring.

7. A clutch coupling arrangement according to claim 6 wherein the clutch coupling sleeve means has a peripheral groove and the balls each have a through aperture by means of which the balls are mounted, in the manner of beads on a string, on the common annular spring, which is disposed in the peripheral groove.

8. A clutch coupling arrangement according to claim 1 wherein the means biasing the balk pin means in a circumferential direction is effective in both circumferential directions to bias the balk pin means from a noninhibiting position to an inhibiting position.

9. A clutch coupling arrangement comprising a rotary drive member having a positive-clutch portion and a synchronizing clutch portion, a rotary shaft member, clutch coupling sleeve means mounted on the rotary shaft member for rotation therewith and axial movement relatively thereto between a disengaged position and an engaged posiiton, positive-clutch means on the clutch coupling sleeve means disengaged in the disengaged position of the clutch couplng sleeve means and engaged by axial movement of the clutch coupling sleeve means in the engaged position with the positive-clutch portion on the rotary drive member, balk pin synchronizer means having a synchronizer clutch member, shouldered balk pin means connected to said clutch member and operatively connected to said clutch coupling sleeve means operative in an inhibiting position for inhibiting axial movement of the clutch coupling sleeve means relative to said balk pin means when said synchronizer clutch member engages said synchronizing clutch portion until the rotary speeds of the clutch coupling sleeve means and the rotary drive member approach synchronism and said balk pin means being circumferentially movable relative to said clutch coupling sleeve means to a non-inhibiting position permitting movement of said clutch coupling sleeve means relative to said balk pin means, said clutch coupling sleeve means being operative on movement from said disengaged position in which said positive-clutch portion and said positive clutch means and said synchronizer clutch portion and said synchronizer clutch means are disengaged to a synchronizing position for initially engaging said synchronizer clutch portion and said synchronizer clutch means for synchronization and then moving further to said engaged position, and biasing means operatively connecting said clutch coupling sleeve means and a balk pin having one biasing member engaging a balk pin for biasing and moving the balk pin of the synchronizer means in a circumferential direction from the non-inhibiting to said inhibiting position when said clutch coupling sleeve is in said disengaged position and prior to reaching said synchronizing position and for providing a yieldable axial connection between the clutch coupling sleeve means and the balk pin for moving said balk pin in said disengaged position and yielding in said synchronizing position.

References Cited
UNITED STATES PATENTS

| | | | |
|---|---|---|---|
| 2,369,842 | 2/1945 | Neracher et al. | 192—53.6 |
| 2,483,841 | 10/1949 | Peterson et al. | 192—53.6 |
| 2,546,746 | 3/1951 | Henning | 192—53.7 |
| 3,218,882 | 11/1965 | Stephens et al. | 74—527 |
| 3,221,851 | 12/1965 | Vander Voort | 192—53.6 |

BENJAMIN W. WYCHE, III, *Primary Examiner.*

LESLIE J. PAYNE, *Assistant Examiner.*

U.S. Cl. X.R.

192—66, 114